United States Patent [19]
Taras et al.

[11] Patent Number: 6,023,938
[45] Date of Patent: Feb. 15, 2000

[54] REFRIGERATION OR AIR CONDITIONING UNIT WITH NOISE REDUCING GRILLE

[75] Inventors: Michael F. Taras, Fayetteville; Walter E. Lare, Jr., Chittenango; Patrick C. Marks, Minoa; Richard J. Wood, North Syracuse, all of N.Y.

[73] Assignee: Carrier Corporation, Syracuse, N.Y.

[21] Appl. No.: 09/153,760

[22] Filed: Sep. 15, 1998

[51] Int. Cl.$^7$ ................................................. F25D 19/00
[52] U.S. Cl. ................................................. 62/296; 454/206
[58] Field of Search ................. 62/296, 404; 454/906, 454/206; 181/225, 224

[56] References Cited

U.S. PATENT DOCUMENTS

| | | | |
|---|---|---|---|
| 3,537,544 | 11/1970 | King . | |
| 3,592,123 | 7/1971 | Henken et al. | 454/202 |
| 4,330,047 | 5/1982 | Ruspa et al. | 181/224 |
| 4,877,106 | 10/1989 | Neville et al. | 181/224 |
| 4,956,978 | 9/1990 | Bleck et al. | 62/239 |
| 5,931,002 | 8/1999 | Nagashima | 62/3.7 |

*Primary Examiner*—Henry Bennett
*Assistant Examiner*—Melvin Jones

[57] ABSTRACT

The open grille structure normally directly in front of a condenser coil is replaced with an acoustical barrier which is moved forward of the condenser coil. In moving the acoustical barrier forward, space results at the top, bottom and sides of the unit which can be used to provide inlet openings for inlet air. Acoustical absorption material lines the structure defining the air flow path to the coil. The modified air flow path results in a modified sound path which results in sound attenuation.

16 Claims, 3 Drawing Sheets

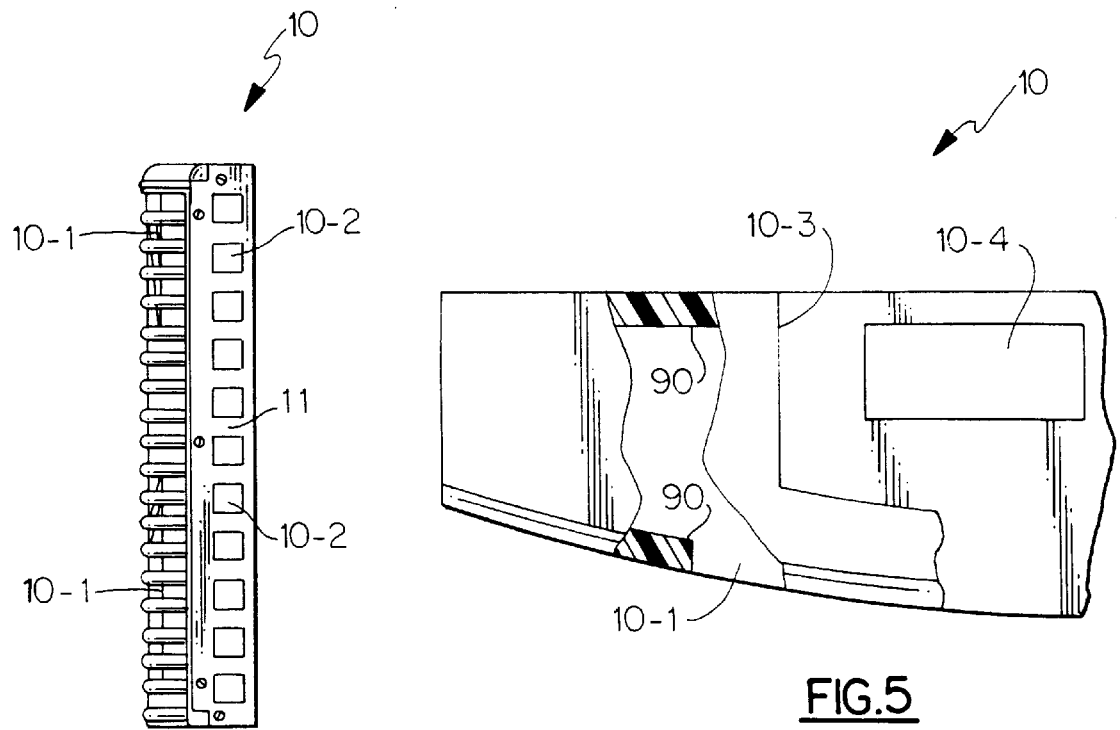
FIG.3
FIG.5
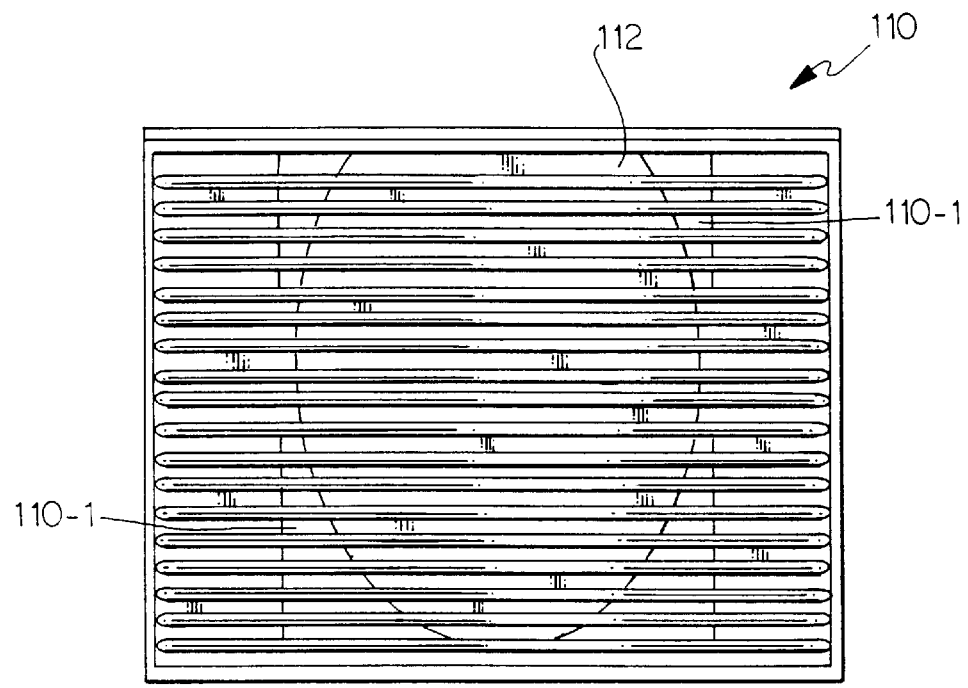
FIG.6

REFRIGERATION OR AIR CONDITIONING UNIT WITH NOISE REDUCING GRILLE

BACKGROUND OF THE INVENTION

In refrigeration and air conditioning units where a fan draws air through a coil, air flow considerations dictate a flow path for the air as a nominally straight flow path, typically, serially through a grille, the coil and into the fan. The direct air flow path results in a direct flow path for sound produced by the operation of the fan. The result is unacceptable sound characteristics for completely opened and partially closed conventional grilles. This is because the condenser fan is a significant source of noise in a transport or any other refrigeration system. Along with the diesel engine, the condenser fan can potentially be the source of annoyance in a community adjacent to a cold storage warehouse or any other facility that uses these products in quantity, as well as a single unit in distribution markets. The noise also can be an annoyance to a driver in the cab of a parked tractor trailer unit. The diesel engine noise can be reduced through the use of an exhaust muffler and intake resonators. The condenser fan noise, however, has traditionally been reduced only by complete fan/system redesign or by the introduction of louvers into the air stream between the fan and grille. The introduction of louvers into a high velocity air stream can cause self noise, a condition wherein the louvers themselves generate aerodynamic noise in addition to producing some attenuation of the condenser fan noise. As a result, the overall noise characteristics are not changed or are only marginally changed. In addition, in order to achieve significant noise reduction with the louvers, air flow can be compromised, which causes detrimental effects on system performance and generally is not acceptable. On the other hand, fan/system redesign often is not feasible due to space limitations and system performance restrictions.

SUMMARY OF THE INVENTION

The basic concept is to provide an acoustical barrier to block the direct radiation of acoustical energy from the fan blades, including blade tip noise, to the outside. The acoustical barrier also blocks the direct air flow which requires modifying the air flow path to offset the flow losses of the acoustical barrier.

It is an object of this invention to reduce the noise in condenser units having large outdoor fans.

It is a further object of this invention to block direct acoustical energy radiated from fan blades to the outside of a refrigeration or air conditioning unit. These objects, and others as will be apparent hereinafter, are accomplished by the present invention.

Basically, the grille structure which is normally directly in front of a condenser coil with the condenser fan located therebehind is replaced with an acoustical barrier which is moved forward of the condenser coil. In moving the acoustical barrier forward, space results at the top, bottom, and sides of the unit which can be used to provide openings for inlet air in addition to the front grille structure remaining after providing the acoustical barrier. Acoustical absorption material lines the structure defining the flow paths to the condenser coil and fan. The invention is also applicable to push through fans such as are used with condenser and evaporator coils.

BRIEF DESCRIPTION OF THE DRAWINGS

For a fuller understanding of the present invention, reference should now be made to the following detailed description thereof taken in conjunction with the accompanying drawings wherein:

FIG. 3 is a side view of the grille of the present invention;

FIG. 5 is a partial, partially cutaway top view of the grille of the present invention; and FIG. 6 is a front view of a modified grille.

DESCRIPTION OF THE PREFERRED EMBODIMENTS

Figure 1:
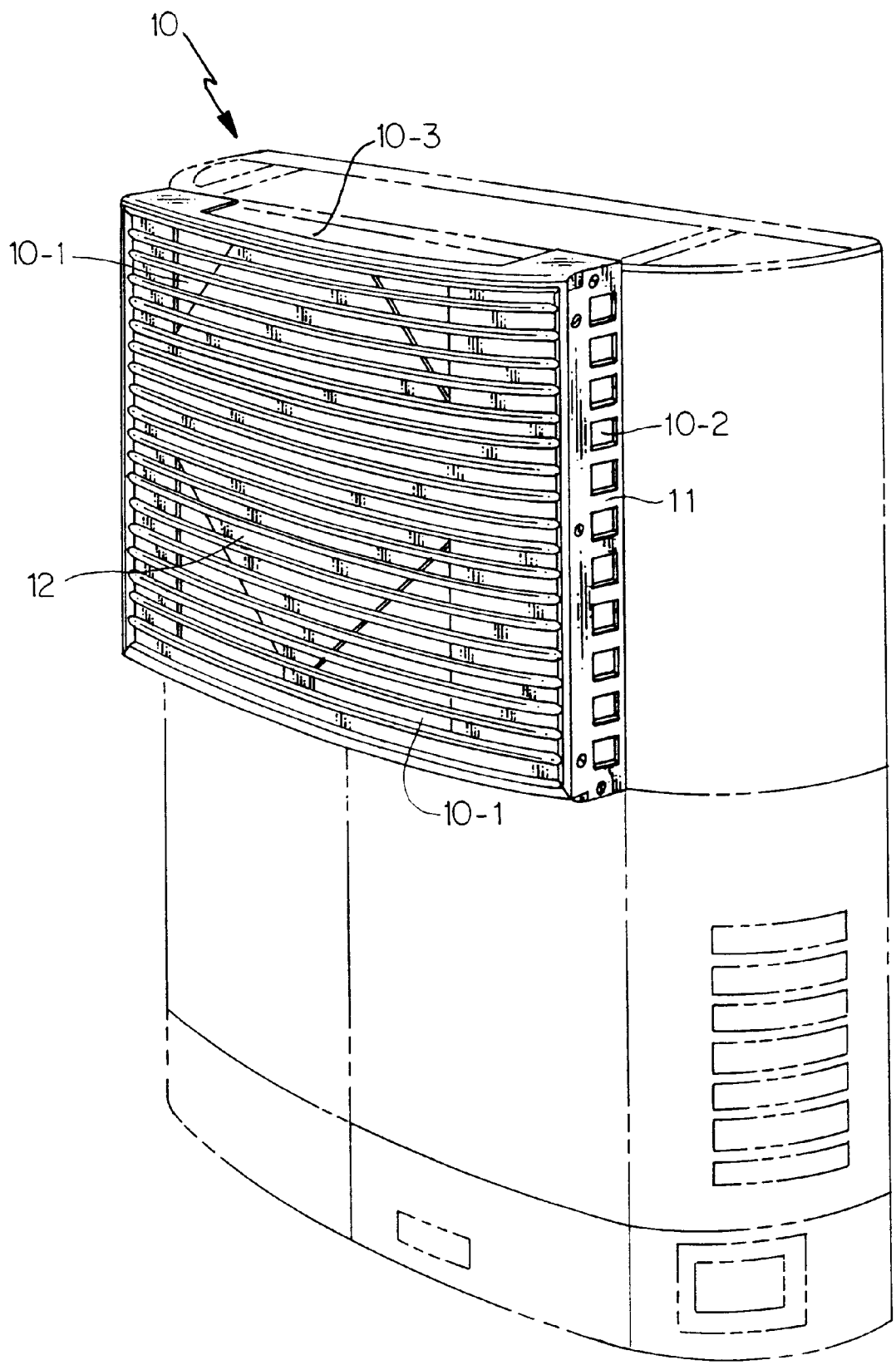
FIG. 1 is a perspective view of the grille of the present invention.

In FIG. 1, the numeral 10 generally designates the noise reducing grille of the present invention shown in relation to a transport refrigeration unit, shown in phantom, as is employed on trailers of tractor trailer units. Grille 10 may also be the inlet or discharge grille of an air conditioning unit or an other than transport refrigeration unit. It will be noted that the grille 10 extends forward of the rest of the transport refrigeration unit. In an actual transport refrigeration unit, the front of the grille 10 will be moved forward, relative to the condenser coil, on the order of three to six inches as compared to a conventional grille. It should be further noted that in moving the front of the grille forward sides, a top and a bottom were created and they provide locations for openings for air flow. The sides 11 can be separate members, usually made of metal, whereas the rest of grille 10 is made of molded plastic. If desired, sides 11 can be made of molded plastic and integral with the rest of grille 10.

Figure 2:
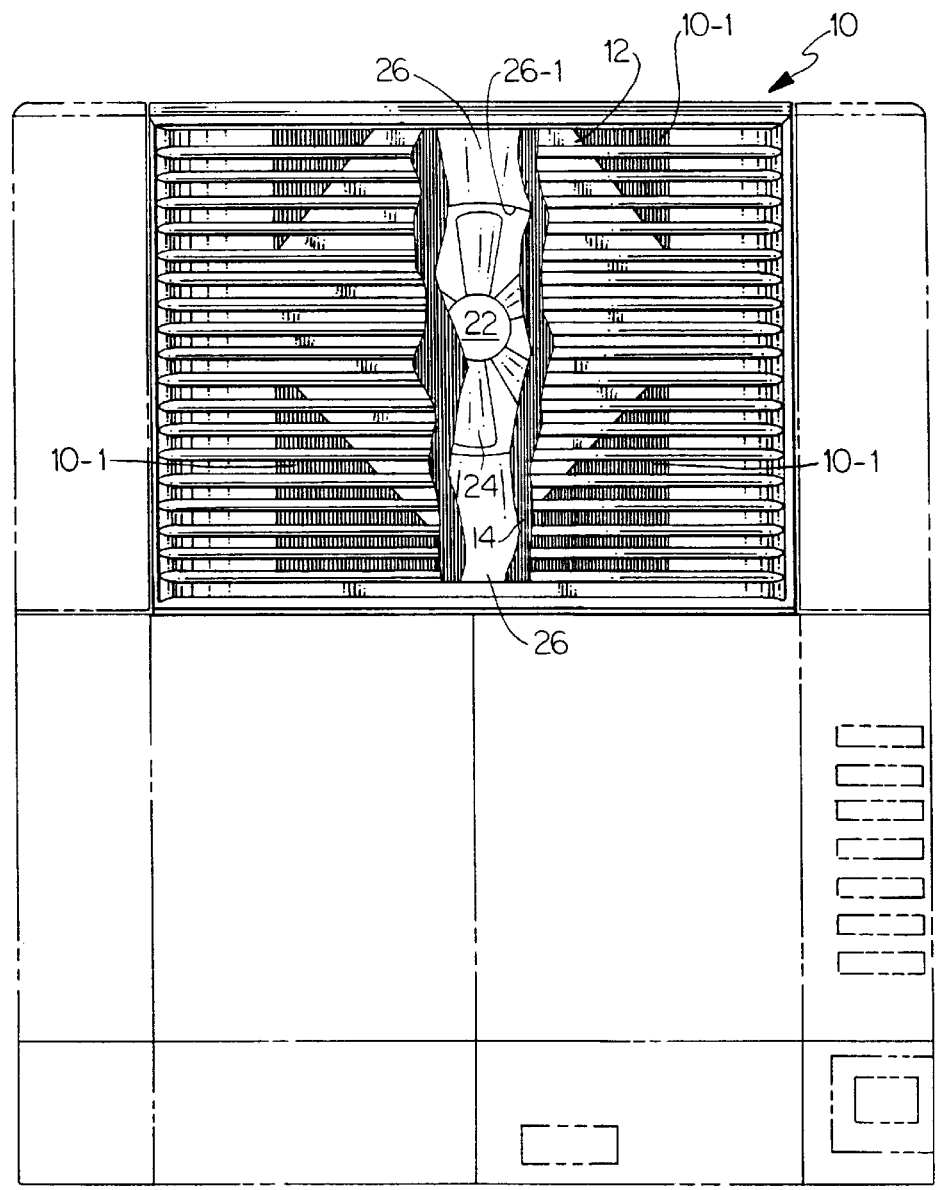
FIG. 2 is a partially cutaway front view of the grille of the present invention.

Referring now to FIG. 2, it will be noted that grille 10 has a solid section 12 defining an acoustical barrier. Acoustical barrier 12 is forward of condenser 14 of transport refrigeration unit 50 which is, in turn, forward of fan 20. Fan 20 includes a hub 22, a plurality of blades 24 and an inlet orifice 26-1 formed in orifice plate 26. It is clear that acoustical barrier 12 intercepts sound radiating forward from fan 20 since it is directly forward of and of greater transverse extent than inlet orifice 26-1. A plurality of openings 10-1 are located in the front portion of grille 10 and define air inlets.

FIG. 3 is a view of the right side of grille 10, as viewed from the front, and the left side would be a mirror image of FIG. 3. A plurality of openings 10-2 are located in members 11 which make up the sides of grille 10 and define air inlets.

Figure 4:
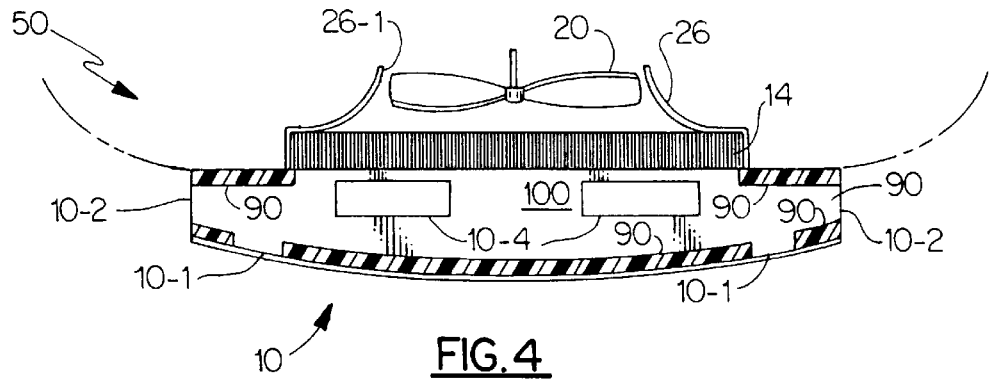
FIG. 4 is a sectioned top view of the grille of the present invention in place on a transport refrigeration unit.

Referring to FIGS. 4 and 5 in combination with FIG. 1, it will be noted that most of the air entering side openings 10-2, top opening 10-3 and bottom openings 10-4 initially flows across condenser coil 14 of refrigeration unit 50 rather than flowing directly through coil 14. This is because orifice plate 26 is coextensive with the coil 14 and is close to coil 14 at its periphery. It is only in the region of the inlet orifice 26-1 and the bell transition to orifice 26-1 that high velocity flow takes place, accounting for most of the flow. Additionally, flow entering openings 10-1 is displaced from inlet orifice 26-1 of fan 20. Accordingly, the space 100 defined between grille 10 and condenser coil 14 can be considered to be a duct or plenum. The air enters openings 10-1, 10-2, 10-3 and 10-4 flowing into plenum 100 and is drawn through condenser coil 14 by fan 20. Collectively, openings 10-1, 10-2, 10-3 and 10-4 make up 30 to 60% of the area of grille 10 with 40 to 50% being preferred.

As described so far, the grille 10 has been made larger and the air flow path more circuitous by the creation of duct or plenum 100. The duct or plenum 100 is lined with acoustical absorption material 90 on all surfaces such that flow through openings 10-1, 10-2, 10-3 and 10-4 and condenser coil 14 will not be blocked. Suitable acoustical absorption material includes open cell foams and fiberglass matting. The acoustical absorption material may be made integral with the acoustical barrier 12. The acoustical material may be provided with a surface treatment to protect it from the environment and/or to minimize air flow path resistance. The sound emanating from fan 20 roughly is in a path which is the reverse of the air flow path and passes through condenser coil 14 and impinges upon the acoustical absorption material 90 which is lining acoustical barrier 12. The sound waves impinging upon the acoustical absorption material 90 lining acoustical barrier 12 are attenuated and reflected. Each reflection further attenuates the noise so that noise leaving grille 10 is significantly attenuated. Sound attenuation in a unit using the present invention was determined and is shown below:

| Octave Band Center Frequency (Hz) | | | | | | |
|---|---|---|---|---|---|---|
| | 250 | 500 | 1000 | 2000 | 4000 | 8000 |
| Sound Attenuation (dB) | 3 | 3 | 6 | 8 | 9 | 9 |

In operation, the fan 20 draws air from plenum 100 through condenser coil 14 taking up heat before being exhausted from the refrigeration unit. In turn, air is drawn into plenum 100 via front openings 10-1, side openings 10-2, top opening 10-3 and bottom openings 10-4. Because acoustical barrier 12 extends peripherally past inlet orifice 26-1 of fan 20 and is spaced from condenser coil 14 a distance on the order of three to six inches, the majority of the air entering plenum 100 via openings 10-2, 10-3 and 10-4 flows transversely over coil 14 before reaching the area between acoustical barrier 12 and coil 14 corresponding to inlet orifice 26-1 where most of the air, nominally, turns 90° in being drawn through coil 14 by fan 20. Openings 10-1 collectively make up four generally triangular areas which overlie coil 14 which is visible therethrough, as best shown in FIG. 2, but are displaced from inlet orifice 26-1 such that most of the air entering plenum 100 via openings 10-1, nominally, turns 90° to flow transversely between acoustical barrier 12 and coil 14 to the region corresponding to inlet orifice 26-1 where the air, nominally, turns 90° in being drawn through coil 14 by fan 20. The circuitous air flow path results in a, nominally, corresponding noise path differing in that sound reflects rather than flows/turns. The inner surface of plenum 100 other than the condenser coil 14 and the openings 10-1, 10-2, 10-3 and 10-4 is lined with acoustical absorption material 90. Accordingly, noise from fan 20 passes through coil 14 and strikes the acoustical absorption material 90 lining acoustical barrier 12 with some of the energy being absorbed and some being reflected. The noise continues to be reflected within the plenum 100 until it is able to pass from plenum 100 through the openings, typically openings 10-1. Each reflection from the acoustical absorption material 90 results in some of the sound being absorbed such that the amount of acoustical energy reflected is reduced and less energy is available to propagate through the grille 10.

FIG. 6 shows grille 110 having a modified acoustical barrier 112 which would function like barrier 12. Barrier 112 is shaped like an ellipse and offers similar advantages to those of barrier 12. Additionally, barrier 112 provides slightly more open area for air flow via openings 110-1. It should be noted that the present invention extends into the space between the truck and the trailer when used on transport refrigeration units. Accordingly, the space required for articulation between a truck cab and its trailer may require further modification of grille in areas where there may otherwise be interference. The present invention does require that the acoustical barrier 12 or 112 be completely coextensive with the fan in a transverse direction.

The present invention is also applicable to use with push through fans as are used both with condenser and evaporator coils as well as to air conditioning units which are distinguished from refrigeration units in their temperature range relative to the conditioned area. Specifically, if fan 20 is a push through fan and coil 14 is acting as an evaporator, plenum 100 will be a discharge plenum, 26-1 will be a discharge orifice and openings 10-1, 10-2, 10-3 and 10-4 will define air outlets and unit 50 can be either a refrigeration or air conditioning unit. Fan 20, in operation, will push air through coil 14 into discharge plenum 100 where the air must pass between coil 14 and acoustical barrier 12 before passing through openings 10-1, 10-2, 10-3 and 10-4 to the area being cooled. While the air flow path is reversed in going from a pull through to a push through fan, the sound path remains the same and the acoustical barrier functions the same for both types of fans.

Although preferred embodiments of the present invention have been described and illustrated other changes will occur to those skilled in the art. For example, if necessary, or desired, some of the openings in one surface may be eliminated and replaced by additional openings in other surface(s) as where the grille is modified to permit articulation between the truck cab and trailer. Also, while the description has been in terms of a transport refrigeration unit, it is equally applicable to air conditioning units. Other shapes for the acoustical barrier can be employed if they cover the condenser fan. It is therefore intended that the present invention is to be limited only by the scope of the appended claims.

What is claimed is:

1. In a transport refrigeration unit having a heat exchange coil, a fan for causing air flow through said coil, an inlet orifice for said fan, a noise reducing grille secured to said unit in a spaced relationship with said coil on the opposite side of said coil on which said fan is located, said grille, said coil and said unit coacting to define a plenum lined with acoustical absorption material, said grille having a plurality of inlets, said grille having a solid portion defining an acoustical barrier with said acoustical barrier being coextensive with said fan and partially coextensive with said coil whereby a portion of said coil is aligned with a portion of said plurality of inlets such that a major portion of air entering said plenum through said inlets must pass transversely across said acoustical barrier before passing though said coil into said inlet orifice and said fan.

2. The refrigeration unit of claim 1 wherein said grille has a top, sides and a front and said inlets are located in said top, sides and front of said grille.

3. The refrigeration unit of claim 1 wherein said grille has a top, a bottom, sides and a front and said inlets are located in said top, sides, front and bottom of said grille.

4. The refrigeration unit of claim 1 wherein said grille has an open area ratio between 30 and 60%.

5. In an air conditioning unit having a heat exchange coil, a fan for causing air flow through said coil, an outlet orifice for said fan, a noise reducing grille secured to said unit in a spaced relationship with said coil on the opposite side of said coil on which said fan is located, said grille, said coil and said unit coacting to define a plenum lined with acoustical absorption material, said grille having a plurality of outlets, said grille having a solid portion defining an acoustical barrier with said acoustical barrier being coextensive with said fan and partially coextensive with said coil whereby a portion of said coil is aligned with a portion of said plurality of inlets such that a major portion of air entering said plenum from said outlet orifice through said coil must pass transversely across said acoustical barrier before passing though said outlets.

6. The air conditioning unit of claim 5 wherein said grille has a top, sides and a front and said outlets are located in said top, sides and front of said grille.

7. The air conditioning unit of claim 5 wherein said grille has a top, a bottom, sides and a front and said outlets are located in said top, sides, front and bottom of said grille.

8. The air conditioning unit of claim 5 wherein said grille has an open area ratio between 30 and 60%.

9. In an air conditioning unit having a heat exchange coil, a fan for causing air flow through said coil, an inlet orifice for said fan, a noise reducing grille secured to said unit in a spaced relationship with said coil on the opposite side of said coil on which said fan is located, said grille, said coil and said unit coacting to define a plenum lined with acoustical absorption material, said grille having a plurality of inlets, said grille having a solid portion defining an acoustical barrier with said acoustical barrier being coextensive with said fan and partially coextensive with said coil whereby a portion of said coil is aligned with a portion of said plurality of inlets such that a major portion of air entering said plenum through said inlets must pass transversely across said acoustical barrier before passing though said coil into said inlet orifice and said fan.

10. The air conditioning unit of claim 9 wherein said grille has a top, sides and a front and said inlets are located in said top, sides and front of said grille.

11. The air conditioning unit of claim 9 wherein said grille has a top, a bottom, sides and a front and said inlets are located in said top, sides, front and bottom of said grille.

12. The air conditioning unit of claim 9 wherein said grille has an open area ratio between 30 and 60%.

13. In a transport refrigeration unit having a heat exchange coil, a fan for causing air flow through said coil, an outlet orifice for said fan, a noise reducing grille secured to said unit in a spaced relationship with said coil on the opposite side of said coil on which said fan is located, said grille, said coil and said unit coacting to define a plenum lined with acoustical absorption material, said grille having a plurality of outlets, said grille having a solid portion defining an acoustical barrier with said acoustical barrier being coextensive with said fan and partially coextensive with said coil whereby a portion of said coil is aligned with a portion of said plurality of inlets such that a major portion of air entering said plenum from said outlet orifice through said coil must pass transversely across said acoustical barrier before passing though said outlets.

14. The refrigeration unit of claim 13 wherein said grille has a top, sides and a front and said outlets are located in said top, sides and front of said grille.

15. The refrigeration unit of claim 13 wherein said grille has a top, a bottom, sides and a front and said outlets are located in said top, sides, front and bottom of said grille.

16. The refrigeration unit of claim 13 wherein said grille has an open area ratio between 30 and 60%.

* * * * *